C. ELTERICH.
Drill-Chucks.
No. 196,205. Patented Oct. 16, 1877.
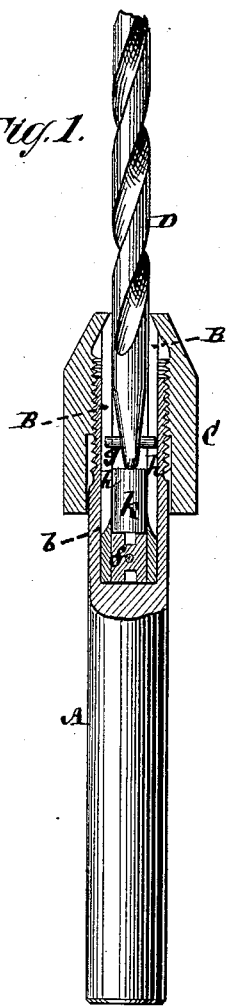
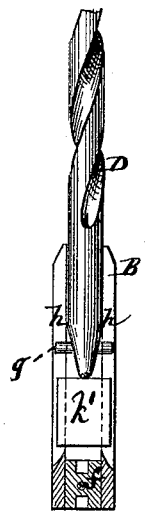
witnesses
John Becker
Frid. Haynes
Inventor
Charles Elterich
by his Attorneys
Brown & Allen

UNITED STATES PATENT OFFICE.

CHARLES ELTERICH, OF NEW YORK, N. Y., ASSIGNOR OF ONE-HALF HIS RIGHT TO ANDREW H. BRIGGS, OF JERSEY CITY, N. J.

IMPROVEMENT IN DRILL-CHUCKS.

Specification forming part of Letters Patent No. 196,205, dated October 16, 1877; application filed August 20, 1877.

*To all whom it may concern:*

Be it known that I, CHARLES ELTERICH, of the city and State of New York, have invented certain new and useful Improvements in Drill-Chucks, of which the following is a description, reference being had to the accompanying drawing, forming part of this specification.

This invention consists in certain combinations, with the slotted spring-jaw ferrule or tube of a drill-chuck, of means for positively driving the drill at or near its rear end by the jaws of the chuck, and for advancing the drill within the latter, such means operating in concert with the spring-hold of the drill by the forward jaw portion of the chuck, substantially as hereinafter described, whereby a more secure driving-hold, free from any possibility of slip, is provided for the drill, and the latter is or may be projected within the chuck.

Figure 1 represents a longitudinal section of a drill-chuck with drill therein and mandrel thereof in accordance with my invention. Fig. 2 is a longitudinal section of the slotted spring-jaw ferrule or tube of the chuck and drill therein, with means for driving the drill at or near its end by the jaws, and for advancing the position of the drill within the chuck. Fig. 3 is a perspective view of an extension-piece which fits the chuck. Fig. 4 is a longitudinal view of the drill as constructed to provide for driving it, by the spring-jaws of the chuck, in a positive manner from the rear end of the latter. Fig. 5 shows a modification of the drill represented in Figs. 1 and 2.

A is the drill-chuck mandrel, constructed with a socket, $b$, at its forward end to receive within it the slotted spring-jaw ferrule or tube B, which is held by any suitable means from turning within the socket. C is the nut which screws on the mandrel A, and is made with a conical outer end that bears on the conical or tapering outer ends of the spring-jaws of the tube B, to cause them to gripe with an elastic pressure on the drill by screwing up the nut, as in other drill-chucks. The ferrule or tube B is closed, at its rear end, by a plug or backing, $f$. D is the drill, which, when inserted within the chuck, is not wholly dependent upon the spring-hold of it by the front ends of the jaws of the ferrule or tube B on screwing home the nut C, but is positively held or driven, at or near its rear end, by said ferrule or tube, through a cross-pin, $g$, stud, or other projection on the drill, arranged to engage with the slots $h$ between the jaws of the chuck.

To provide for setting the drill forward in the chuck as wear or breakage of it may render necessary or advisable, so as to utilize the whole or greater portion of the drill, and to adapt it to different kinds of work, an extension pin or peg, $k$, may be loosely introduced within the bore of the ferrule or tube B, for the back end of the drill to rest against, or a flat extension-piece, $k'$, loosely inserted within or through the slotted sides of the tube or ferrule, may be substituted for the pin or peg.

By this construction of the drill and use of a detachable extension-piece or back-rest for the drill, the latter has its position advanced in the chuck, as required, and still a positive and direct driving-connection is maintained between the tube or ferrule B and the drill D, at or near the back end of the latter, by the spring-jaws of the tube and cross pin or projection attached to the drill, and engaging with the slots between the jaws of the tube, as described, in addition to the spring-hold of the drill, by the elastic jaws of the tube as controlled by the nut C.

Fig. 5 shows the extension-piece $k'$ as permanently attached to the rear end of the drill.

I claim—

1. The combination, with the spring-jaws of the chuck and their conical closing-nut, of a pin or projection on the drill arranged to engage with the slots between the jaws, substantially as and for the purpose herein set forth.

2. The extension-piece $k$ or $k'$, in combination with the slotted spring-jaw ferrule or tube B and drill D, constructed to engage, at or near its rear end, with the slots between the jaws of the chuck, essentially as described.

CHARLES ELTERICH.

Witnesses:
FRED. HAYNES,
BENJAMIN W. HOFFMAN.